United States Patent [19]
Chang et al.

[11] Patent Number: 5,240,570
[45] Date of Patent: Aug. 31, 1993

[54] SURFACTANT AUGMENTED IN-SITU REMOVAL OF PCBS FROM SOIL BY ELECTROOSMOSIS

[75] Inventors: Hsueh-Rong Chang, Scotia; Tah-Mun Su, Schenectady, both of N.Y.

[73] Assignee: General Electric Company, Schenectady, N.Y.

[21] Appl. No.: 827,315

[22] Filed: Jan. 29, 1992

[51] Int. Cl.$^5$ ............................................. C25C 1/22
[52] U.S. Cl. .............................. 204/130; 204/182.2; 204/180.1
[58] Field of Search ................. 204/130, 182.2, 180.1

[56] References Cited

U.S. PATENT DOCUMENTS

| | | | |
|---|---|---|---|
| 4,132,625 | 1/1979 | Peterson et al. | 204/299 R |
| 4,783,263 | 11/1988 | Trost et al. | 210/638 |
| 5,074,986 | 12/1991 | Probstein et al. | 204/130 |
| 5,098,538 | 3/1992 | Kim et al. | 204/182.2 |
| 5,137,608 | 8/1992 | Acar et al. | 204/130 |

OTHER PUBLICATIONS

L. Bjerrum, J. Moum and O. Eide, Geotechnique, 17, "Application of Electro-osmosis to a Foundation Problem in a Norwegian Quick Clay", pp. 214–235 (1967).
Leo Casagrande, Boston Civil Engineers 69 (2), "Stabilization of Soils by Means of Electro-osmosis State-of-the-Art", pp. 255–302 (1983).
N. C. Lockhart, Colloids and Surfaces, 6, "Electroosmotic Dewatering of Clays. I. Influence of Voltage", pp. 229–251 (1983).
N. C. Lockhart, Int. J. Mineral Processing, 10, "Electro-Osmotic Dwatering of Fine Tailings From Mineral Processing", pp. 131–140 (1983).
R. F. Probstein and A. P. Shapiro, Chemical Processing, 11, "Electroosmotic Decontamination of Hazardous Waste Sites", pp. 35–40 (1990).
R. F. Probstein, "Physicochemical Hydrodynamics: An Introduction", p. 192, Butterworth (1989).
A. P. Shapiro, P. C. Renaud and R. F. Probstein, Solid/Liquid Separation: Waste Management and Productivity Enhancement, H. S. Muralidhara, Ed., pp. 346–353, Battelle Pres, Columbus, Ohio (1981).
P. C. Renaud and R. F. Probstein, J. Physico Chemical Hydro., 9, "Electroosmotic Control of Hazardous Wastes", pp. 345–360 (1987).
D. L. Bedard, et al, GE Research and Development Program for the Destruction of PCBs, Third Annual Progress Report, p. 3 (CRD Internal Report), June (1984).

Primary Examiner—John Niebling
Assistant Examiner—Arun S. Phasge
Attorney, Agent, or Firm—Lawrence P. Zale; Marvin Snyder

[57] ABSTRACT

In-situ extraction of contaminants, such as PCBs, from soil is achieved by an electroosmosis technique. The soil is treated with a low concentration surfactant solution used as a purging liquid. The contaminant is dissolved in the ground water, aided by the purging liquid. An electric field is applied to a region of the soil causing the ground water, contaminant and surfactant to move by electroosmosis to a collection point where the purging liquid, dissolved contaminant and surfactant are collected and removed from the soil. This method may also be used to control the direction of seepage of the contaminants.

6 Claims, 16 Drawing Sheets

X may be H or Cl

SURFACTANT AUGMENTED IN-SITU REMOVAL OF PCBS FROM SOIL BY ELECTROOSMOSIS

BACKGROUND OF THE INVENTION

1. Field of the Invention

The present invention relates to a method of soil decontamination and more specifically to a method of soil decontamination induced by electric fields.

2. Description of Related Art

Electroosmosis is the phenomena of migration of an ionic liquid through a porous charged surface under the action of an applied electric field.

Electroosmosis has been applied to reducing the water content of soil and consolidating the soils for construction purposes as described in Bjerrum, L., et al., Geotechnique, 17, P. 214–235 (1967) and Casagrande, L. J., Boston Civil Engineers, 69 (2), P. 255–302 (1983).

Electroosmosis has also been applied to reducing the water content of mine tailings and waste sludges as described in Lockhart, N. C., Colloids and Surfaces, 6, P. 229–251 (1983) and Lockhart, N. C., Int. J. Mineral Processing, 10, P. 131–140 (1983).

U.S. Pat. No. 4,783,263 Detoxification Process by Trost, P. B. and Rickard, R. S. issued Nov. 8, 1988 describes a method of soil decontamination that comprises collecting contaminated soil, mixing it into a slurry and adding surfactants or alkaline agents to the slurry. This is referred to as a batch process. The surfactants or alkaline agents are used to concentrate the contaminants into a liquid phase. The liquid phase is then removed with the contaminate. This method is not an in-situ method since it involves digging up the contaminated material before processing it.

FIG. 1 illustrates principles of electroosmosis. During electroosmosis an electrolyte solution 4, such as an ionic water solution, moves through a plurality of pores 6 relative to a surface of a porous media 2 such as soil, clay, sand or other mineral particles under the influence of an applied electric field. Typically, a porous medium 2 accumulates a number of negative charges 8 at the surfaces in contact with electolyte or ionic solution 4. These charges attract a number of positive ions 10 in solution 4 and repel negative ions 12. Positive ions 10 will therefore predominate in the layer of ionic solution 4 next to the surface of porous medium 2. The electrostatic interaction between the charges 8 in the surface and the ions 10 in the water produces an "electric double layer", in which the surface charge of the porous medium 2 is balanced by an adjacent layer of charges 10 of opposite sign in ionic solution 4. In typical soils saturated with aqueous solutions, the double layer is very thin, on the order of 1-10 nanometers as described in Probstein, R. F., et al., Chemical Processing, 11, P. 35–40 (1990).

A static electric field is applied to the soil having electric field lines in the pore in the direction shown by arrow 14. The static electric field is established in the soil by applying a D.C. voltage across a pair of electrodes, anode 16 and cathode 18. The electric field exerts an electrostatic force on the charged double layer, causing ionic solution 4 to move in a direction parallel to the electric field. Ionic solution 4 migrates toward and accumulate near one of electrodes. The accumulated ionic solution is then removed by some appropriate means such as pumping.

The bulk of the liquid in the pores far from the double layer is set in motion by viscous interaction with ionic solution 4 near the double layer. R. F. Probstein, in Physicochemical Hydrodynamics: An Introduction, p. 192, Butterworth (1989) showed that the induced liquid velocity, v, is given by the expression:

$$v = \frac{\epsilon \zeta}{\mu} E \quad (1)$$

where $\epsilon$ is the electric permittivity of the liquid, $\mu$ is the liquid viscosity, $\zeta$ is the surface potential of soil corresponding to the charge it accumulates, and $E$ is the applied electric field. The induced liquid velocity, v, increases with increasing electric field, but decreases as the liquid becomes more viscous. Since liquid movement is parallel to the electric field lines, the direction of flow is highly controllable with the electroosmosis process.

Another advantage of the electroosmosis process is that the flow distribution 19 of FIG. 1 is uniform, being essentially a plug profile. A plug flow distribution is characterized by low fluid flow velocity near the surfaces, while the flow velocity is constant across a large area in the center of the pore. Plug flow distributions are independent of pore size and uniformity of pore sizes as described in Probstein id. at p. 35–40 (1990). Due to plug flow, electroosmosis can be effective with low-permeability soils and clays and soils that are not very porous.

The removal of chemical species from porous media by means of electroosmosis relies on the movement of the pore liquid containing the contaminant species toward one electrode where the liquid is collected. A purging liquid is introduced to maintain soil saturation to prevent crack formation as the liquid within the soil is removed. The purging liquid also preserves the effectiveness of electroosmosis. For further detailes see Shapiro, A. P. et al., Solid/Liquid Separation: Waste Management and Productivity Enhancement, H. S. Muralidhara, Ed., P. 346–353, Battelle Press, Columbus, Ohio.

Efforts to apply electroosmosis techniques to the removal of contaminants from a waste site are relatively recent. Renaud and Probstein carried out limited laboratory studies on the use of electroosmosis for the removal of acetic acid and phenol from saturated clay samples. These are described in Renaud, A. P., et al., J. Physico Chemical Hydro., 9, P. 345-360 (1987). Their work showed that electroosmosis might be particularly useful in control and remediation at hazardous waste sites.

Removal of contaminants from the soil is further complicated when the contaminant is not soluble in the electrolyte solution. As is commonly the case, in-situ contaminants are trapped in soil having a considerable amount of ground water. Many of the hazardous contaminants are not water soluble, and removal of the contaminants is very difficult.

Currently there is a need for a method of removal of contaminants which are not water soluble in-situ. Also, there is a need to control the direction of seepage of contaminants imbedded in the ground.

SUMMARY OF THE INVENTION

An electroosmotic procedure for removing contaminates such as polychlorinated biphenyls (PCBs) from soil in-situ is performed by dispensing a purging liquid through the soil to make contact with the contaminant and cause the contaminant to be dissolved in ground water. A static electric field is applied to the soil and ground water causing the ground water, dissolved contaminant and purging liquid to move in a direction parallel to the electric field lines. The water, including purging liquid, and dissolved contaminant are then collected and pumped to the surface for processing.

Since the direction of movement of the contaminant is in the direction of electric field lines, the present invention may also be used to control the direction of seepage of contaminants embedded in the soil.

OBJECTS OF THE INVENTION

An object of the present invention is to provide a simplified method for removing contaminants from a porous medium in-situ.

Another object of the present invention is to provide a method for removing contaminants from a porous medium in-situ more rapidly and completely than previously possible.

Another object of the present invention is to provide a method of controlling the direction of seepage of contaminants embedded in soil.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

Figure 1:
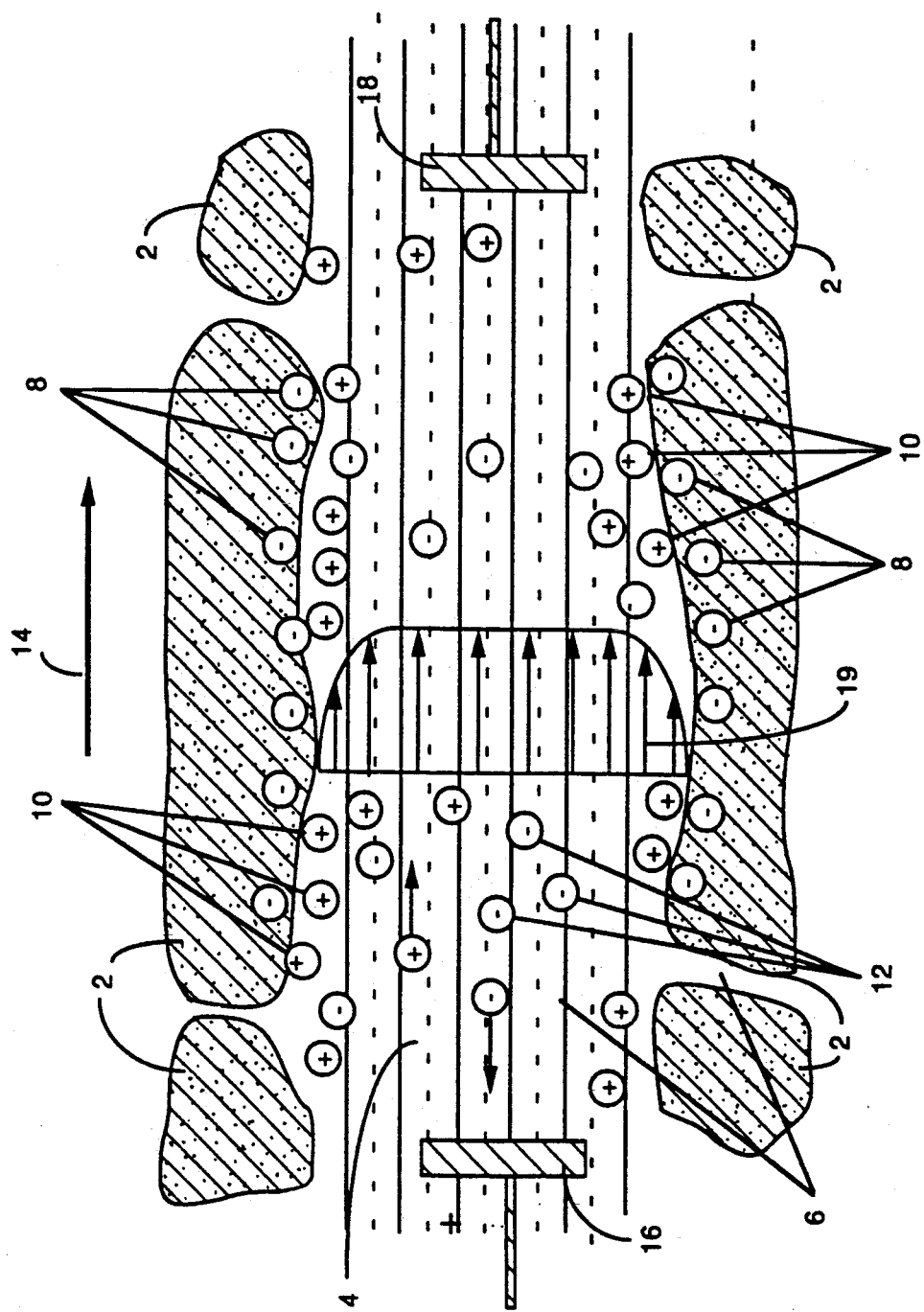
FIG. 1 is a schematic illustration of electroosmotic flow of an ionic solution in a porous charged medium.
Figure 2:
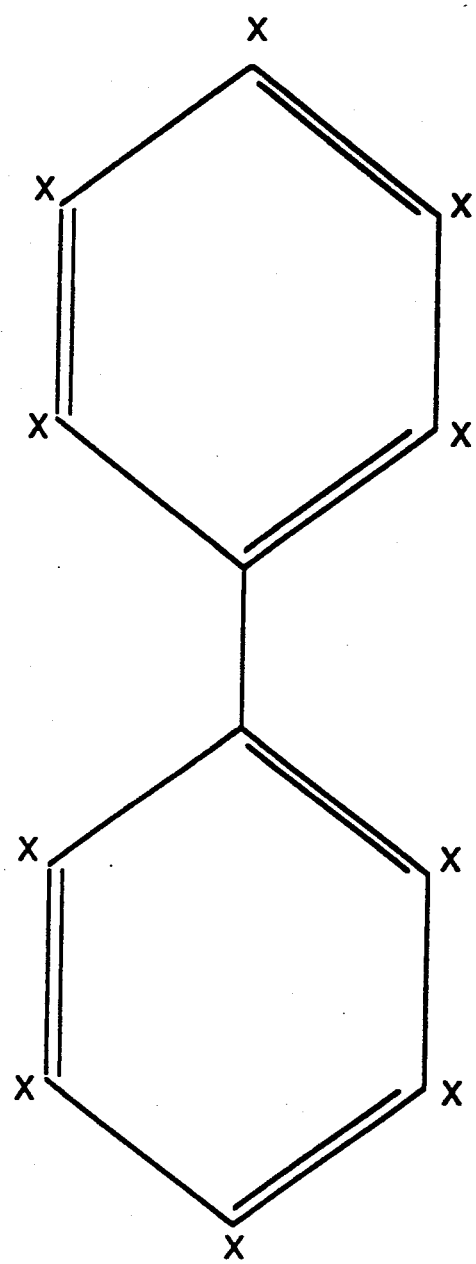
FIG. 2 is an illustration of a general chemical structure for a polychlorinated biphenyl compound.

FIG. 2 shows the general chemical structure for poly-chlorinated biphenyl (PCB) compounds, a group of common toxic contaminants. These contaminants, like many other contaminants, are not soluble in water due to their non-polar nature. When a contaminant such as PCB is released into the soil containing ground water, it becomes very difficult to extract.

Figure 3:
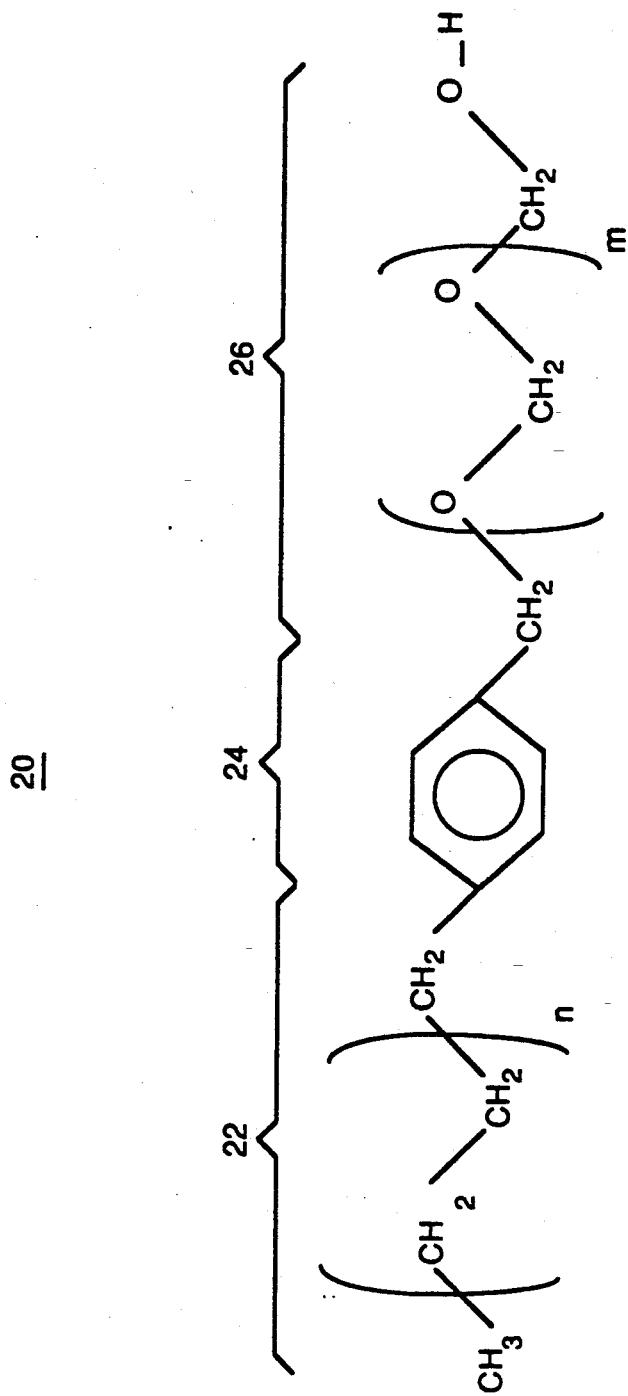
FIG. 3 is an illustration of a general chemical structure for a surfactant compound.

FIG. 3 is a general chemical structure for a surfactant molecule 20 which typically has a polar side 26 and a non-polar side 22. It may or may not have a central portion such as a benzene ring 24. The non-polar side 22 of surfactant 20 has a repeating pattern, which is enclosed in parenthesis, that may be repeated n times, where n is usually 1 to 6. The non-polar side 22 of surfactant 20 readily dissolves in non-polar materials such as hydrocarbons. On the other hand, the polar side 26 of surfactant 20 is readily attracted to polar molecules and dissolves in polar solutions such as water solutions. The polar side 26 has a repeating pattern, which is enclosed by parenthesis, that may be repeated m times, where m is typically 5 to 16. The surfactant molecule 20, by having both a polar and non-polar side functions to dissolve non-polar molecules in polar solutions. This is accomplished by having the polar side 22 attach to polar molecules and the non-polar side combine with a polar solvent. This is more readily seen in FIG. 4.

Figure 4:
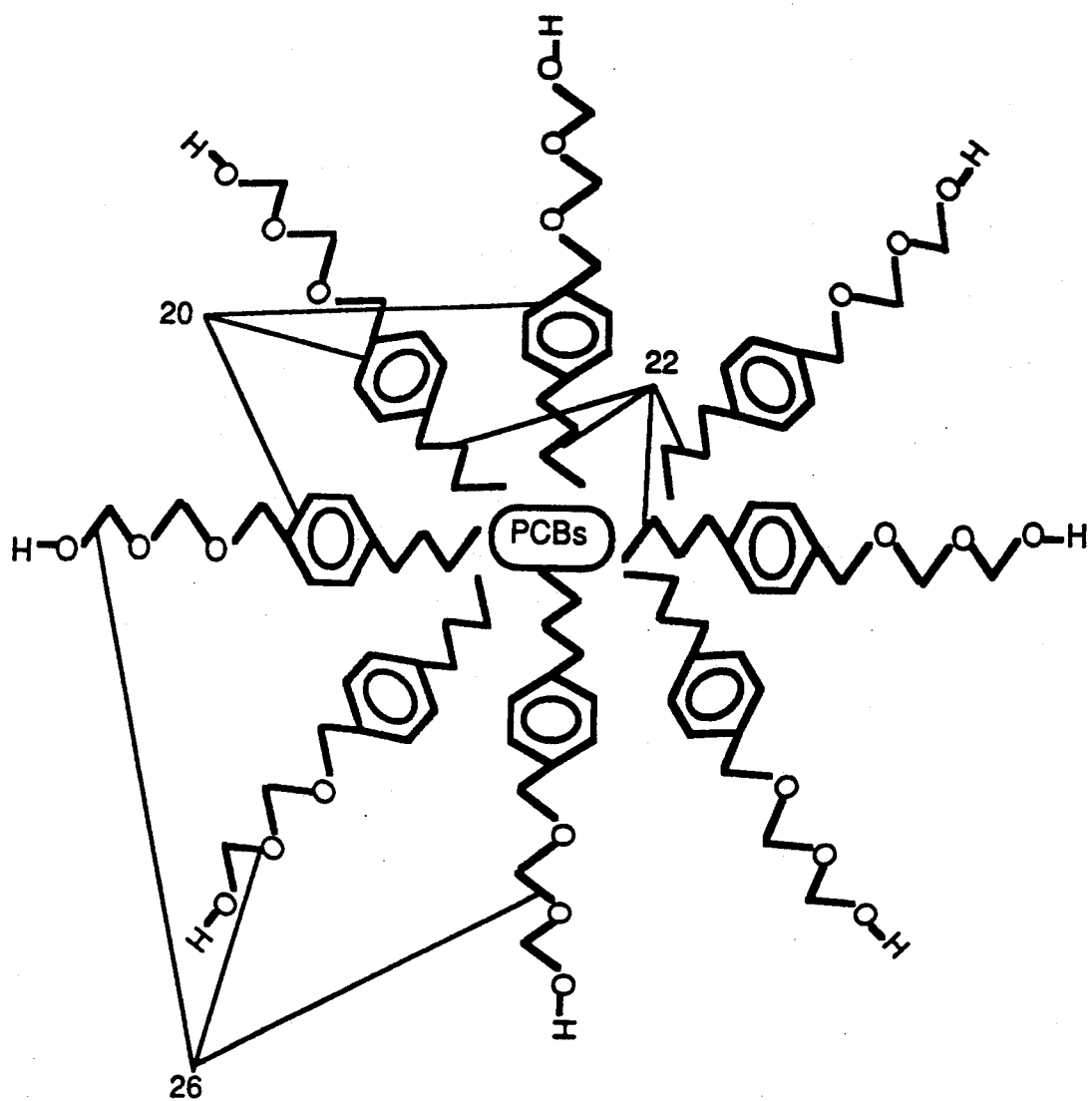
FIG. 4 is an illustration of a micelle created by the attraction of surfactant molecules to a PCB molecule.

In FIG. 4, a PCB molecule is shown surrounded by surfactant molecules 20. The non-polar PCB molecule is attracted to the non-polar side 22 of surfactant molecules 20. The polar sides 26 of surfactant 20 are repelled by the non-polar molecule PCB. This creates the arrangement known as a micelle. The outer perimeter of the micelle is comprised of the polar sides of the surfactant molecules that attract the polar solvent molecules. This allows the entire micelle to be dissolved in a polar solvent.

Figure 5:
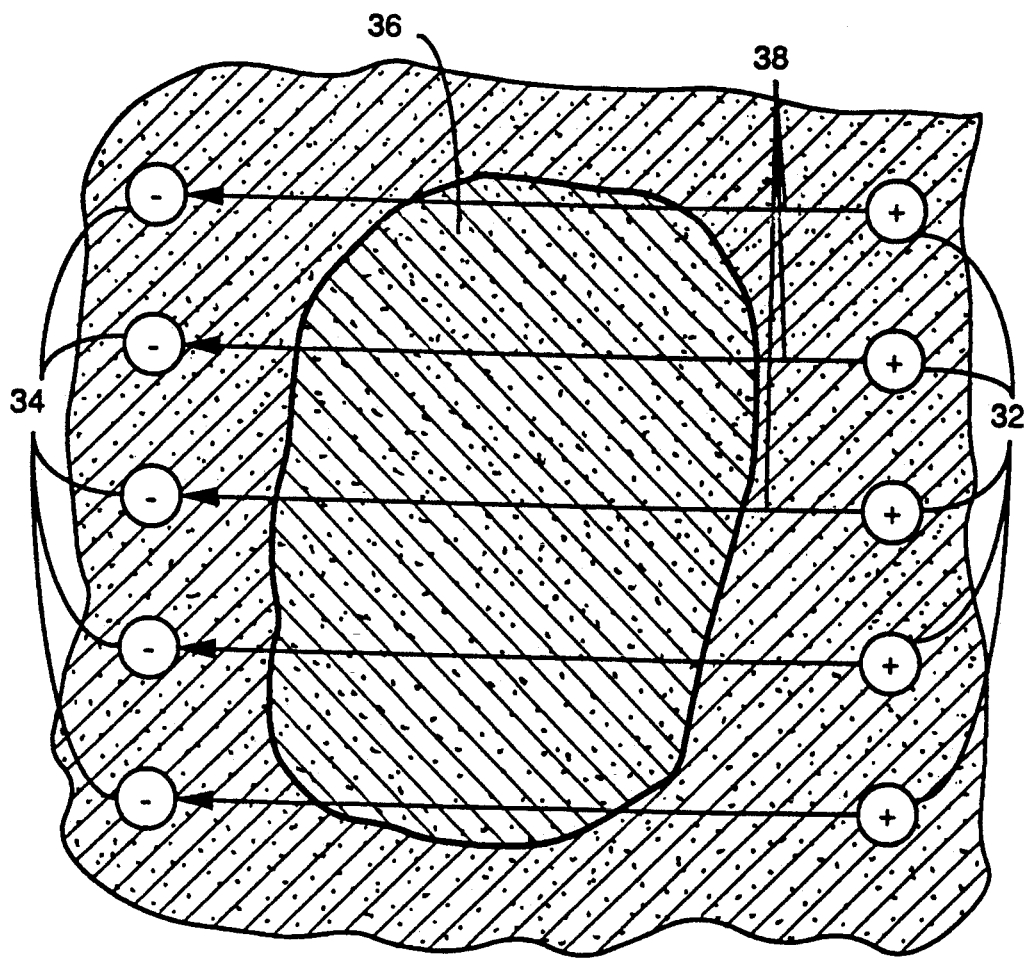
FIG. 5 is a schematic illustration of a first embodiment of the electrode arrangement according to the present invention.

FIG. 5 shows a number of cathodes 34 and anodes 32 which are held at a voltage difference by a power source. The cathodes and anodes produce an electric field over the contaminated soil. An amount of contaminated soil 36 has been treated with a surfactant to produce a number of micelles in solution. The electric field causes this solution to move in the direction of the arrows 38 to the cathodes 34, near which the solution, contaminants and surfactant are collected.

Figure 6:
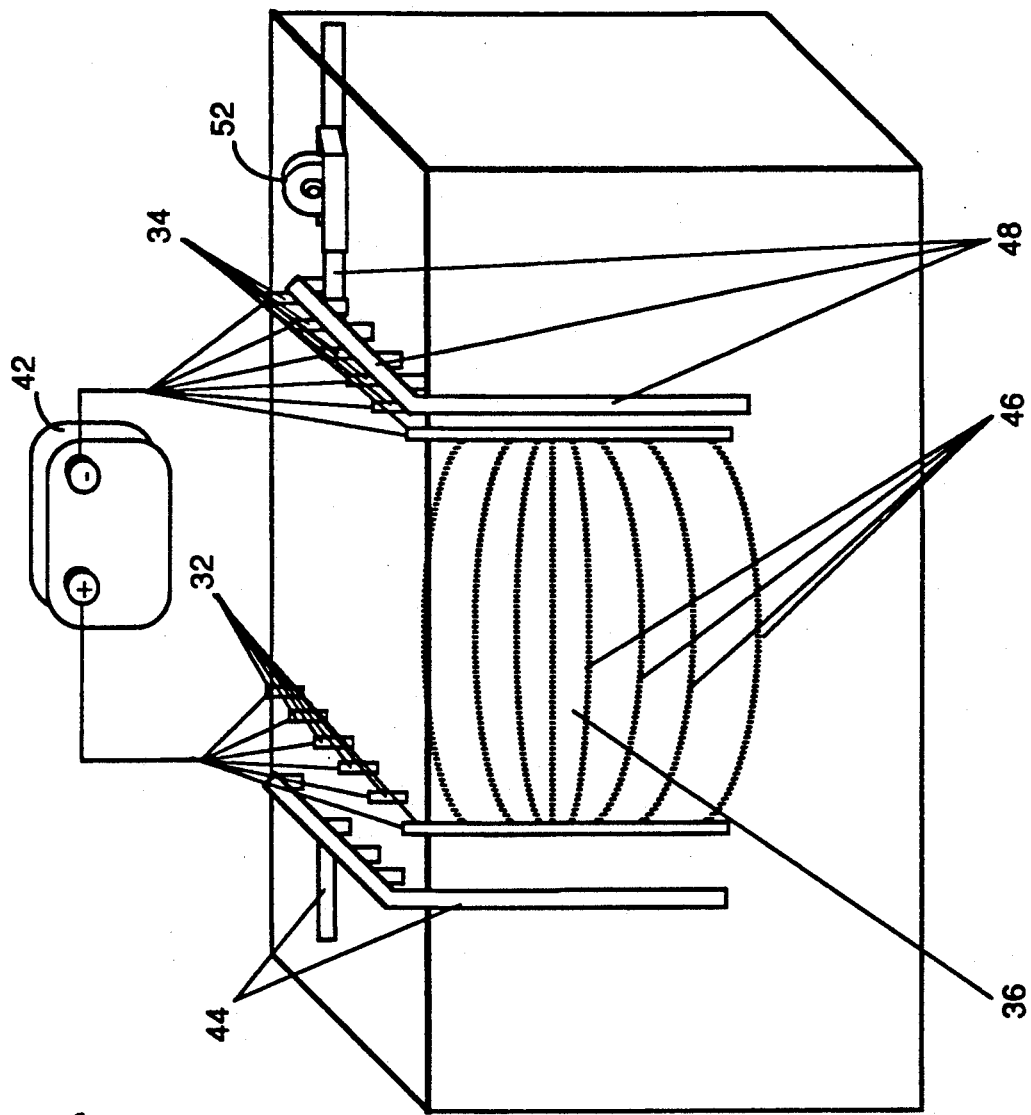
FIG. 6 is a cutaway diagram of operation of the present invention in-situ.

FIG. 6 illustrates the arrangement of cathodes and anodes of FIG. 5 as they would appear in-situ. Power source 42 provides a DC electric voltage to anodes 32 and cathodes 34. These electrodes are spaced apart from each other and are imbedded in the contaminated soil 36. A purging liquid containing a surfactant is introduced through inlet conduits 44 and percolates through the contaminated soil 36. Groundwater present in contaminated soil 36 acts as an ionic solution. The electric field, represented by field lines 46, produced by the electrodes causes gravitation of the ionic solution in the contaminated soil toward collection conduit 48. The surfactant and contaminant create micelles which are dissolved in the ionic solution and move with the ionic solution toward cathodes 34 and eventually to conduit 48. A liquid pump 52 collects the ionic solution contaminant and surfactant and pumps it out of the soil. The entire arrangement of FIGS. 5 and 6 may be repeated many times, with the solution, contaminants and surfactant being collected near the cathodes.

Figure 7:
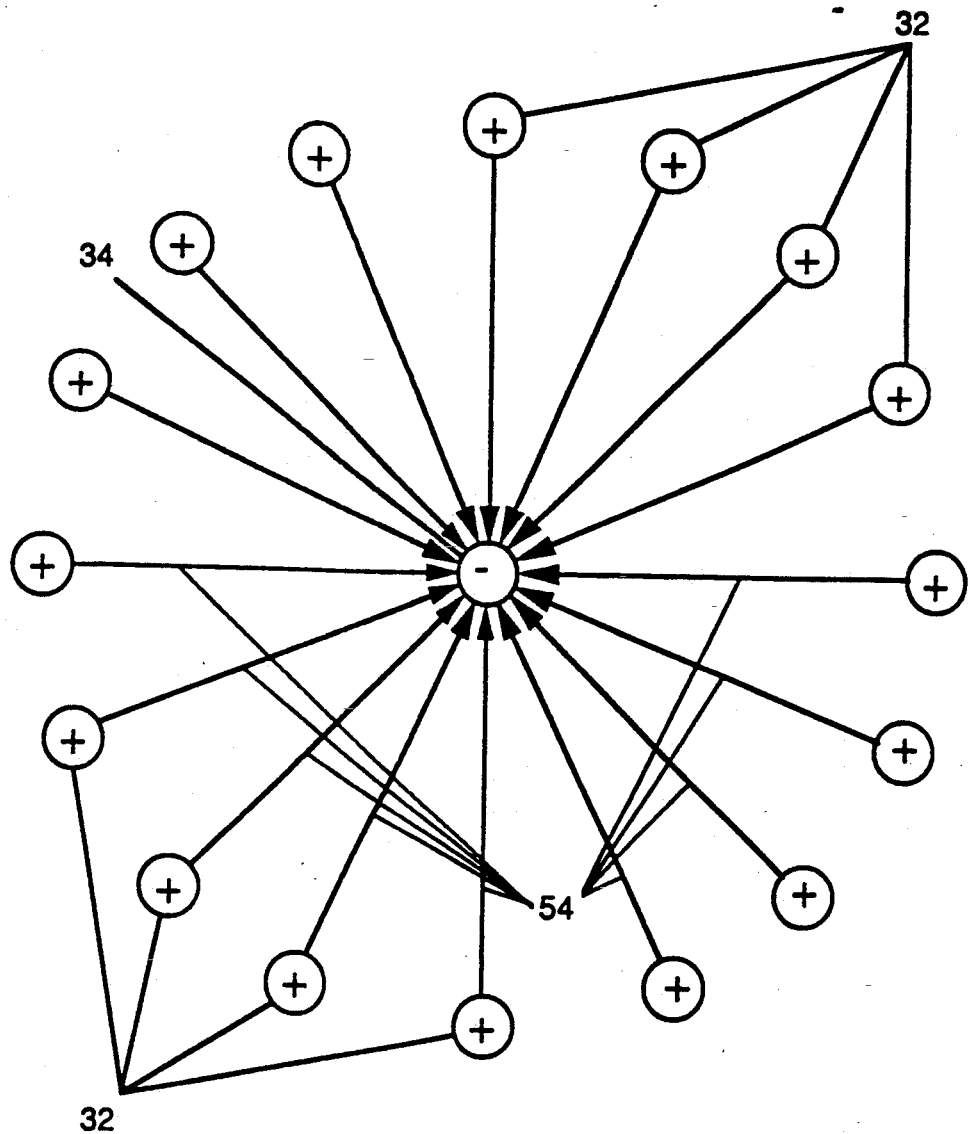
FIG. 7 is a schematic illustration of a second embodiment of the electrode arrangement according to the present invention.

FIG. 7 shows the second embodiment of anode and cathode placement for the present invention. Cathode 34 is surrounded by anodes 32 which causes the ionic solution containing the micelles of PCBs and surfactant to move in a direction marked by arrows 54 toward the center cathode. The solution, contaminant and surfactant are collected near the central cathode 34.

The voltage difference between the cathode and anode is proportional to the electric field strength. The greater the electric field strength, the greater the force moving the ionic solution along the electric field lines. The velocity in which the ionic solution moves is a function of this force. As the ionic solution passes through the contaminated soil, the contaminant is dissolved in the ionic solution with the aid of the surfactant. The lower the flow velocity of the ionic solution, the greater the time of surface contact between the solution and the contaminant, and the greater the solubility of the contaminant in the ionic solution. This results in two competing factors, time of surface contact versus velocity of ionic solution flow. In order to rapidly remove contaminants from the soil, a large ionic flow velocity is desired. A large flow of velocity, however, allows less of the contaminant to be dissolved in the ionic solution. Therefore, if a large electric field is created, a great amount of ionic solution migrates toward the cathode, but has a low concentration of contaminant. At a lower electric field strength, a smaller amount of ionic solution migrates toward the cathodes, but has a higher concentration of contaminant. These two competing factors must be balanced in order to optimize the amount of contaminant extracted from the soil.

Figure 8:
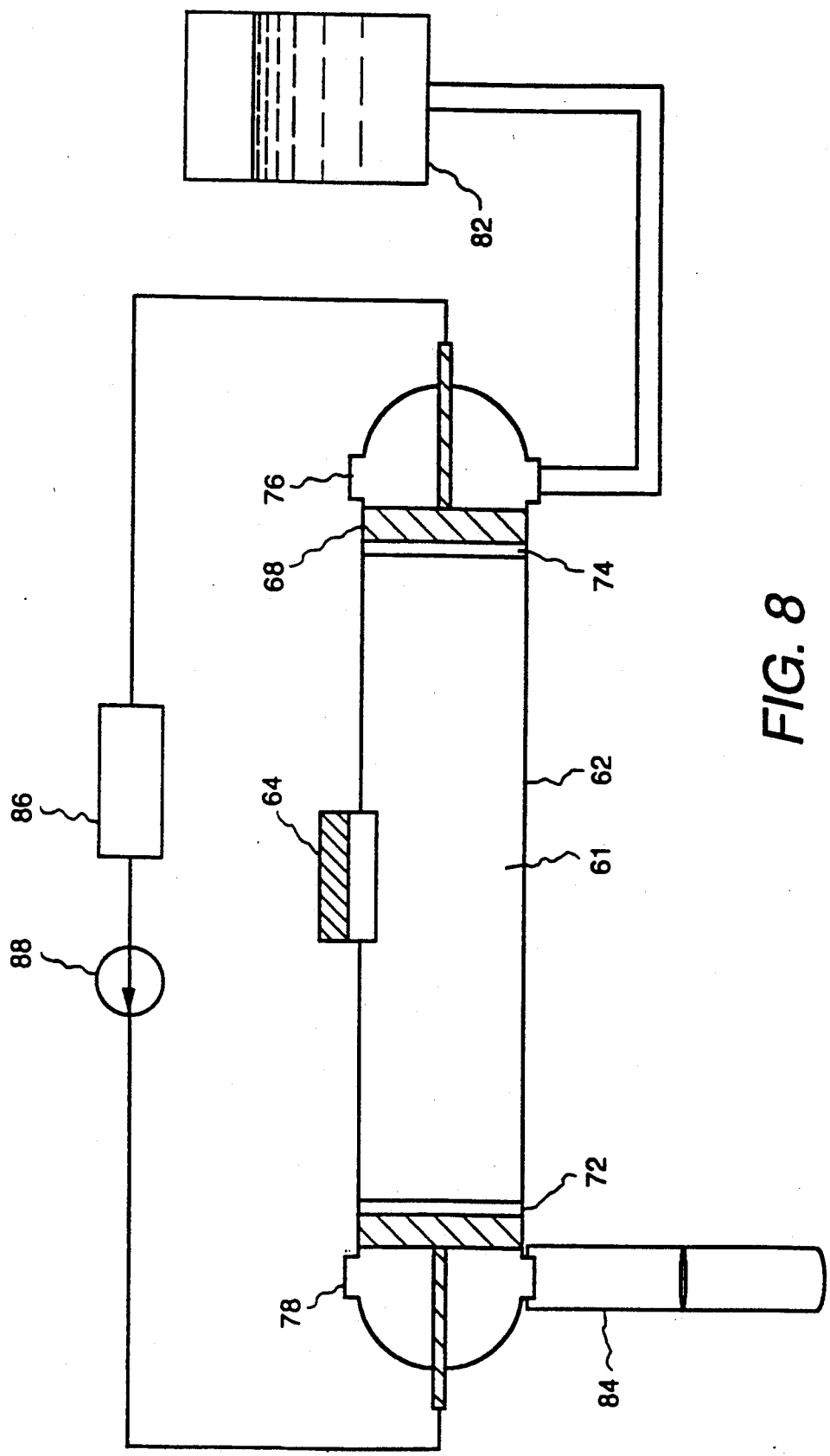
FIG. 8 is a block diagram of an apparatus used in testing the method of the present invention.

FIG. 8 is a schematic diagram of the apparatus used to test the method of the present invention. A test cell was constructed with a glass tube 62 of about 1.0 cm inner diameter, with one opening 64 at the center to be used for loading an amount of soil 61 into the test cell. Electrodes 66, 68 were made of perforated graphite to allow the purging fluid to flow through the electrodes. The distance between the two electrodes was about 3.2 cm. The electrodes and soil 61 were separated by sintered glass filter discs 72, 74 to prevent direct contact between them. There was one opening 76, 78 at each end of the test cell for venting the gases generated by electrolysis. A purging solution was introduced from a purging container 82 near anode 68 at atmospheric pressure. A voltage was applied across electrodes 66, 68 by a voltage source 86. Current was measured by an ammeter 88. The effluent was collected near cathode 66 with a calibrated glass container 84.

PCBs have a limited solubility in water, particularly for highly chlorinated PCBs such as Aroclor ® being a mixture of polychlorinated biphenyl (PCB) congeners containing 60 weight % chlorine 1260 available from Monsanto Corporation. The removal of contaminants from soil can be greatly enhanced by using an appropriate purging liquid which has a high solubility for the contaminant species. The addition of surfactant to the water results in an increase of PCB solubility by a factor of $10^5$–$10^6$ as described in *GE Research and Development Program for the Destruction of PCBs*, by D. L. Bedard, et al., Third Annual Progress Report, GE Corporate Research and Development, June (1984), page 3.

A non-ionic surfactant, Triton X-100 polyethylene Glycolp-Isoctylphenyl Ether, was obtained from the Rohm and Haas Corporation and used to prepare a purging solution. Desired amounts of surfactant were dissolved in distilled water to arrive at 0.2% and 0.5% surfactant solutions. Surfactant concentration was calibrated by UV absorption measurement. In this study, we found that UV absorption of surfactant Triton X-100 at a wavelength of 292 nm exhibits a linear relationship with concentration up to 1.75%. The prepared surfactant solution was placed in a purging liquid container. The liquid level in the container was kept at about the same height as the test cell to minimize the flow of the purging fluid in the test cell caused by hydraulic pressure.

A control experiment was carried out to assure that the movement of the purging liquid in the test cell was induced by the applied electric field. When the purging liquid was introduced into the test cell loaded with the soil without applying the voltage across the electrodes, no liquid was collected at the cathode side for 24 hours; however, liquid flow was observed when an electric field was applied to the test cell. This result indicated that the back pressure caused by the packed soil in the test cell prevented the flow of the purging liquid by hydraulic pressure, and the movement of the liquid in the soil required the aid of an electric field.

In order to extract PCBs effectively from soil, purging liquids containing different concentrations of the non-ionic surfactant were evaluated in our initial study. There are four different kinds of surfactants, namely anionic, cationic, non-ionic and amphoteric surfactants, available as doping agent to enhance solubility of PCBs in water. The non-ionic surfactant was chosen because the micelle of the non-ionic surfactant is uncharged and the electric field would not cause its migration.

Figure 9A:
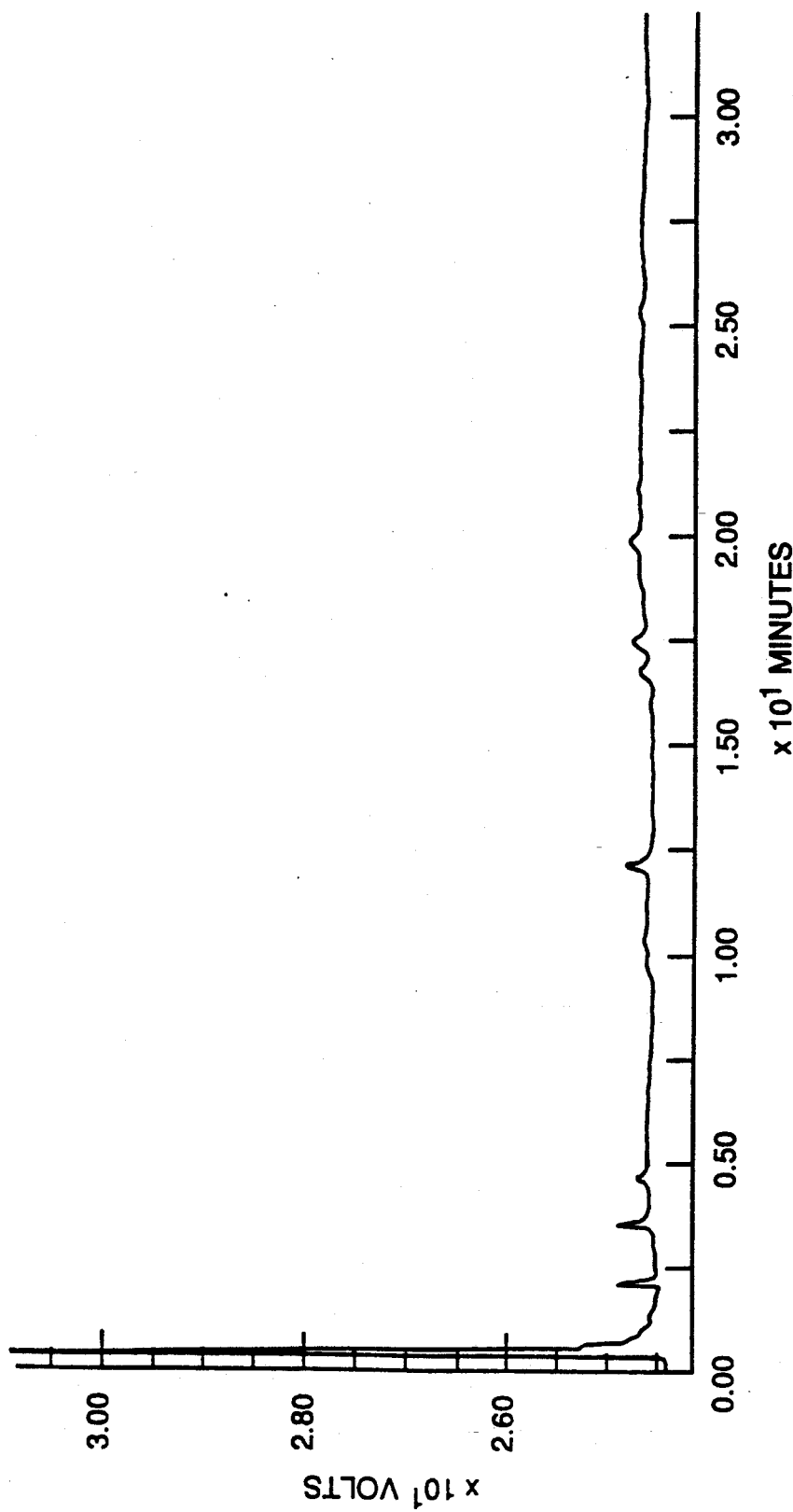
FIG. 9a is a pack-column gas chromatogram showing the amount of PCBs extracted from a soil sample using tap water as a purging liquid.
Figure 9B:
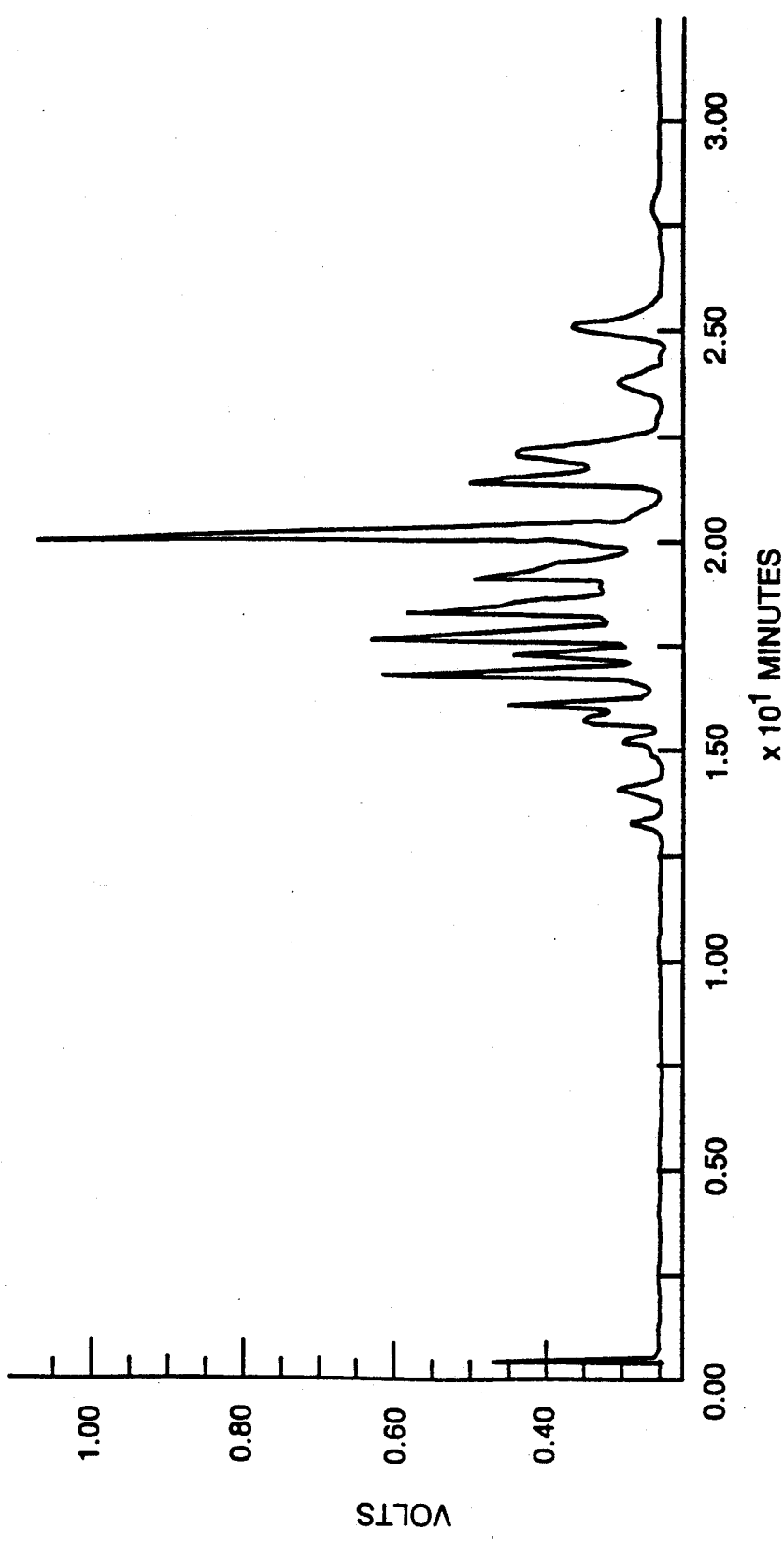
FIG. 9b is a pack-column gas chromatogram showing the amount of PCBs extracted from a soil sample using a 0.5% surfactant solution as a purging liquid.
Figure 10A:
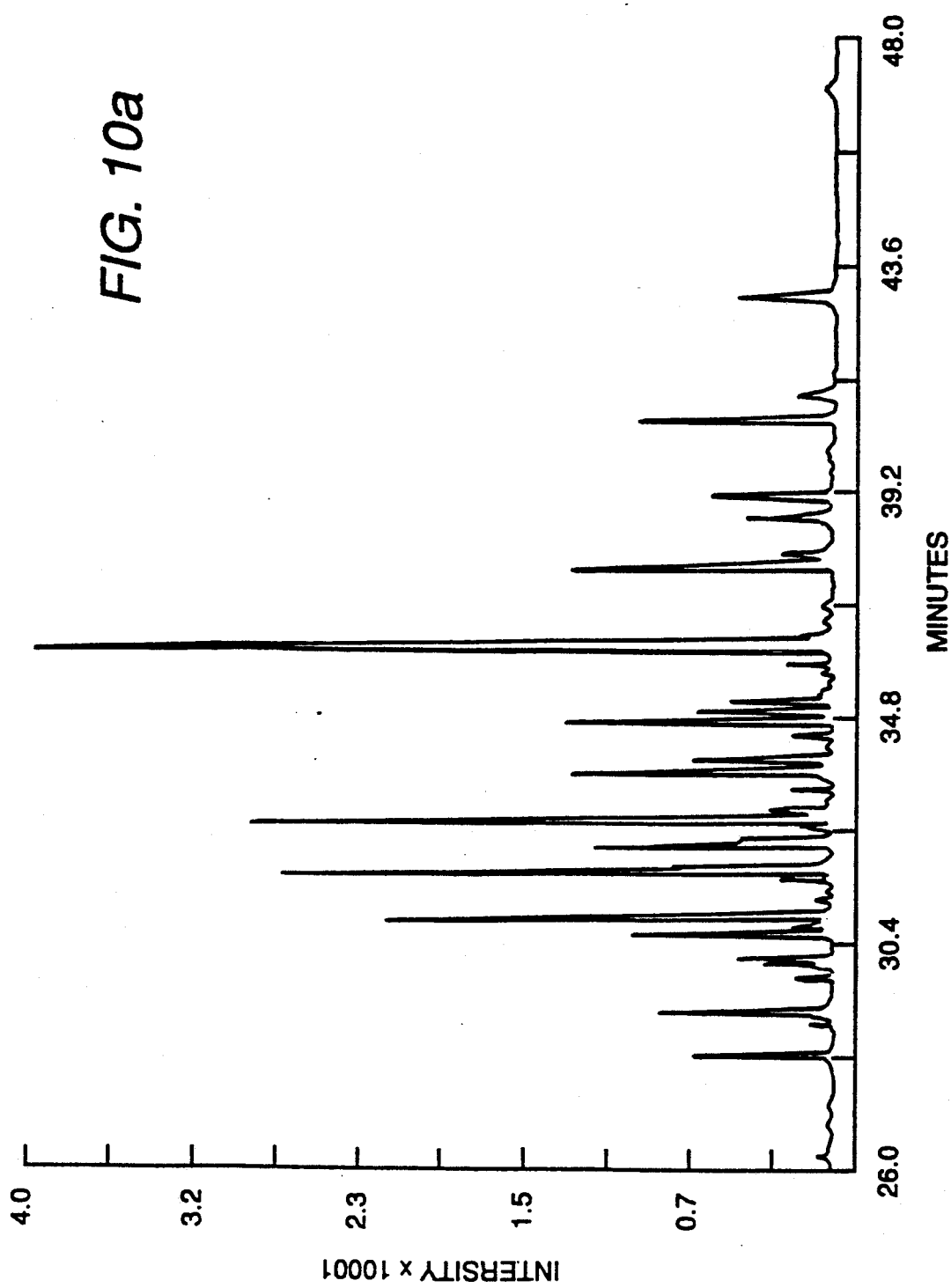
FIG. 10a is a capillary gas chromatogram of mixtures of polychlorinated biphenyl (PCB) congeners containing 60 weight % chlorine, Aroclor ® 1260.
Figure 10B:
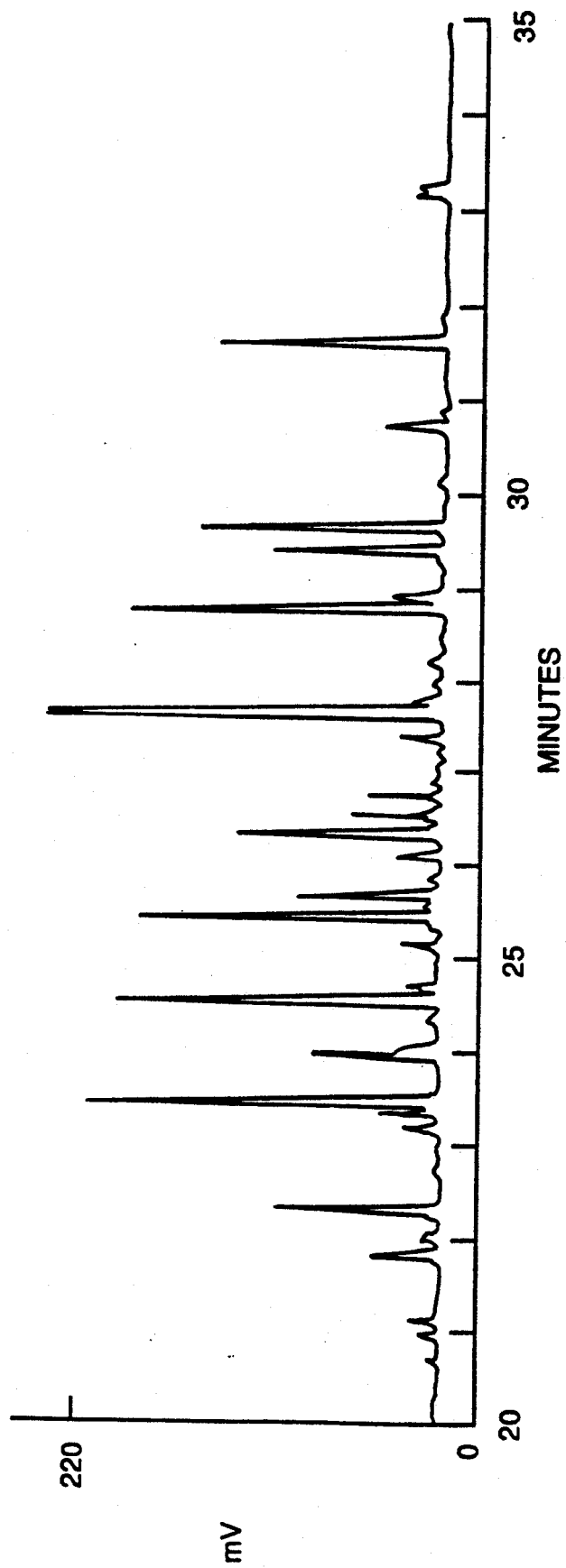
FIG. 10b is a capillary gas chromatogram showing the amount of PCBs extracted from a soil sample using a surfactant solution as a purging liquid.

To demonstrate the efficacy of surfactant solution as a purging liquid for the extraction of PCBs in this application, tap water was initially used as the purging liquid. The result shown in FIG. 9a revealed that a small amount of PCBs was extracted from the soil. The concentration of the PCBs in the collected aqueous solution was about 20 ppb. However, when the purging liquid was doped with 0.5% non-ionic surfactant, a high concentration of PCBs was found as indicated in FIG. 9b. The capillary gas chromatogram of the extracted PCBs as shown in FIG. 10b is practically identical to that of PCB sample Aroclor ® 1260 as shown in FIG. 10a. None of the isomers was preferentially extracted by the purging liquid. This observation was consistent with the reported results obtained from a batch extraction of PCBs by Bedard et al. id. The surfactant concentration in the collected fluid was also found to be about the same as the concentration in the purging fluid.

Figure 11:
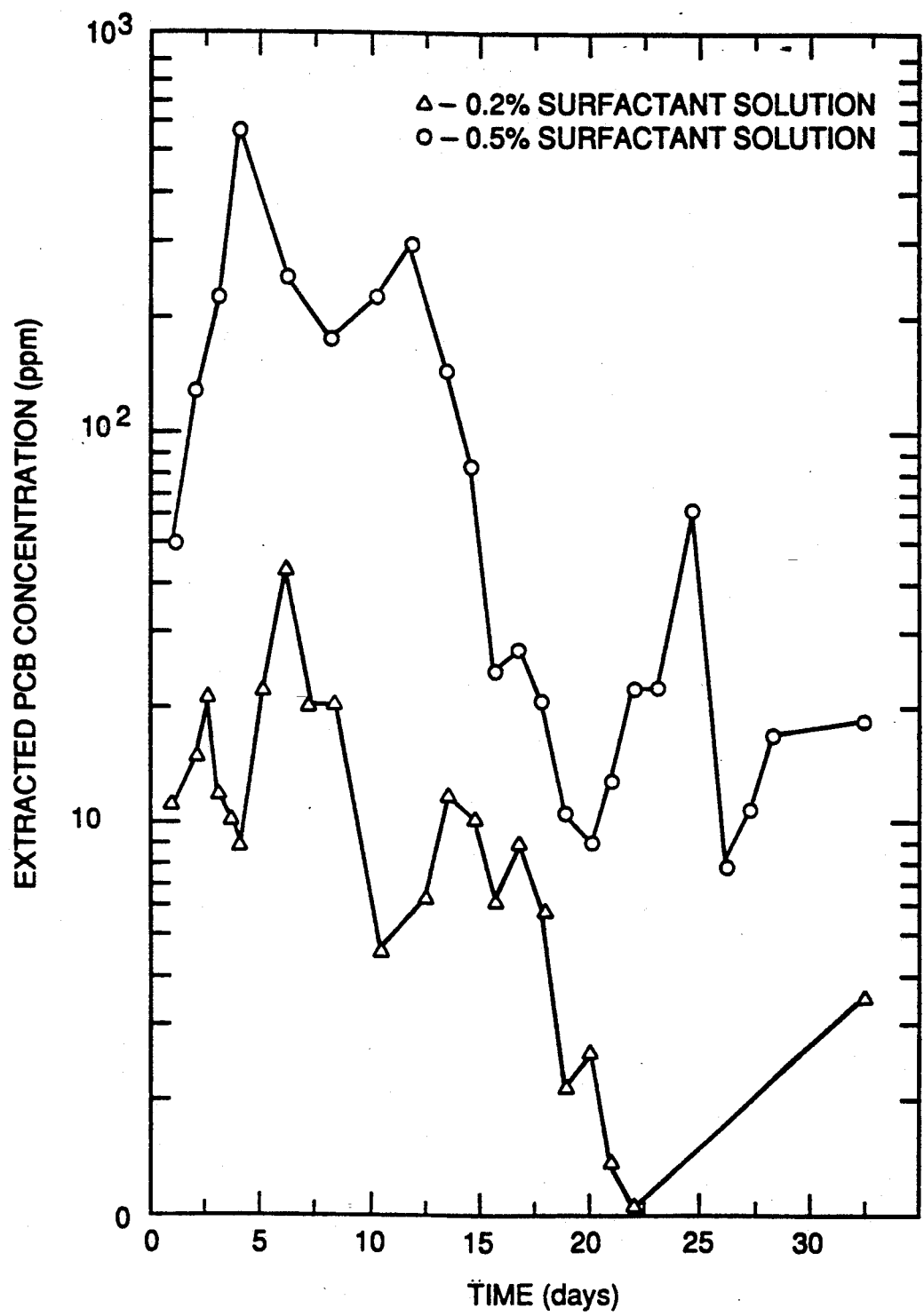
FIG. 11 is a graph of the PCB concentration extracted from two soil samples vs. time using two different surfactant concentration respectively.

The effect of surfactant concentration in the purging liquid on PCB extraction was also evaluated. Increasing the surfactant concentration from 0.2% to 0.5% caused the amount of PCB in solution to increase approximately one order of magnitude, as indicated in FIG. 11. In order to increase the concentration further, the velocity of the purging liquid can be reduced by applying a lower electric field, according to equation (1). The contact between surfactant and PCBs can, therefore, be improved to enhance the solubility of PCBs in water.

Figure 12A:
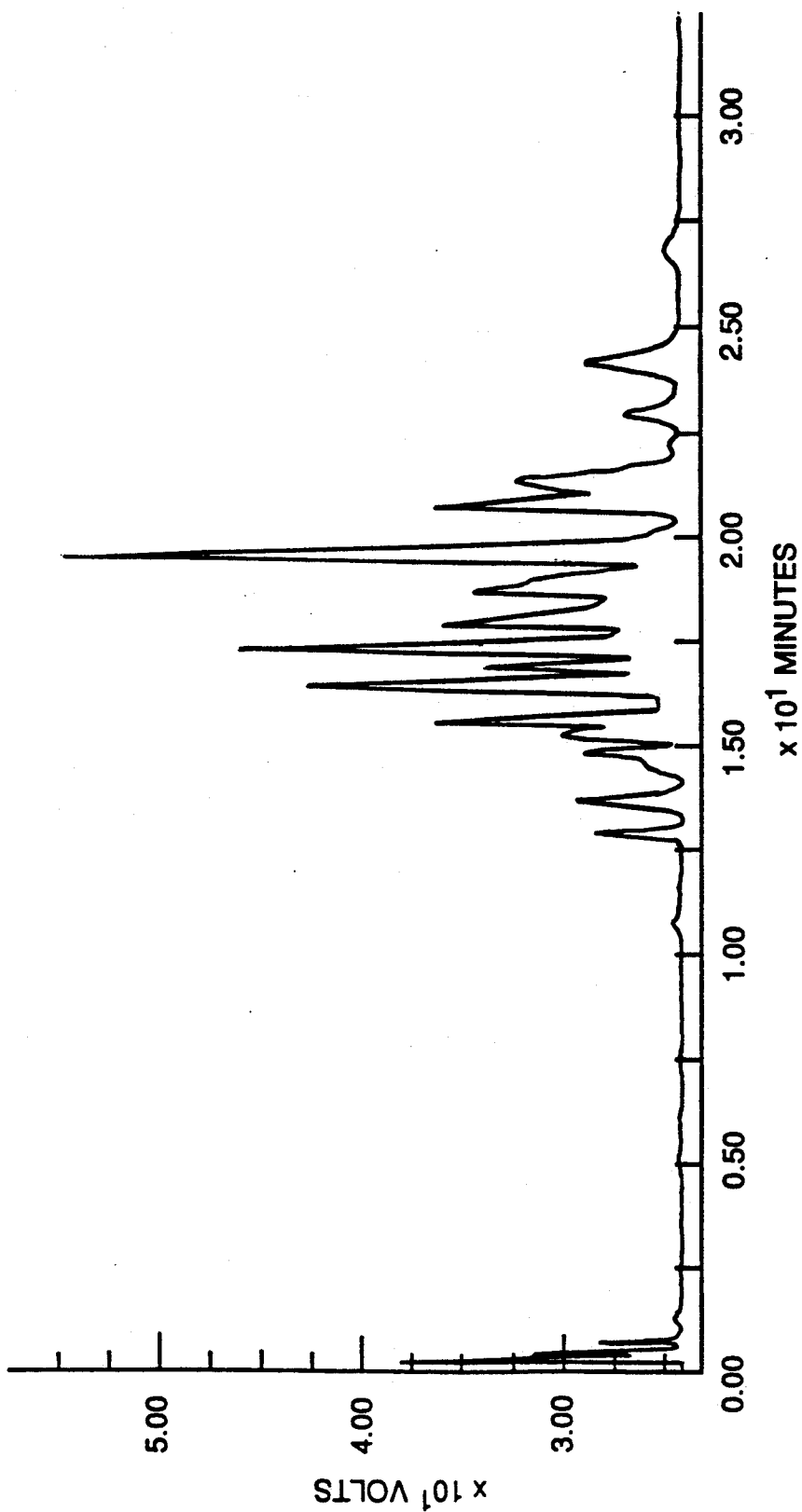
FIGS. 12a and 12b are gas chromatograms of a PCB sample with a known mixture of PCBs, Aroclor ® 1260 and a soil sample containing unknown residual mixture of PCBs and PCBs respectively.
Figure 12B:
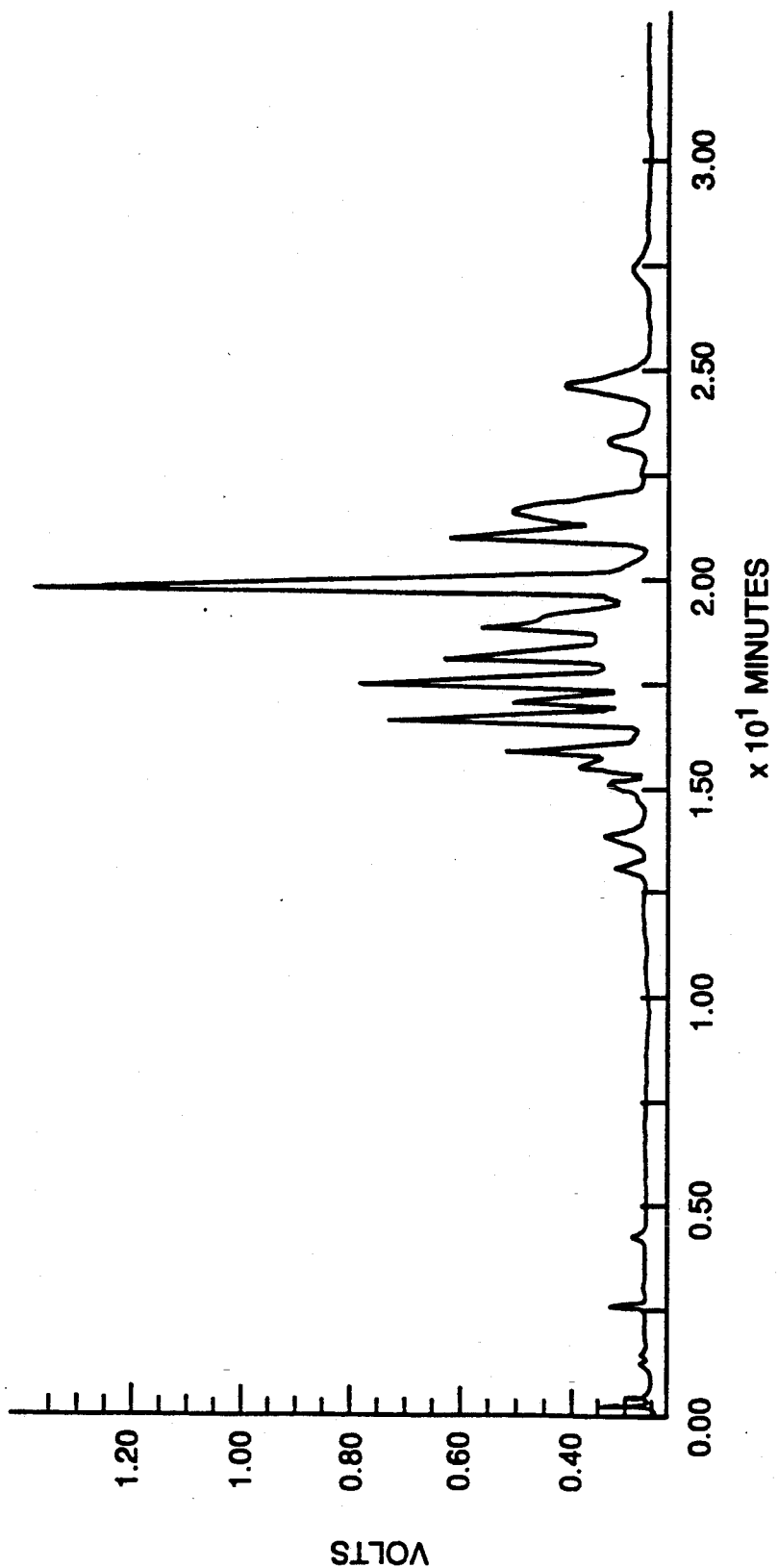

The PCB contaminated soil was obtained from a locality in Boston, Mass. The soil, which was dark brown clay-like dry material and contained 1045 ppm of PCB sample Aroclor ® 1260, was characterized by gas chromatography using a pack column shown in FIG. 12b. Its chromatogram was comparable to that of standard PCB sample Aroclor ® 1260 (FIG. 12a). The soil was loaded into the test cell without any treatment.

The voltage applied to the test cell was 50 volts with an initial current of 0.15 mA which gradually decreased to a steady value of about 0.02 mA after 15 days. The flow rate of the purging liquid decreased concomitantly. Temperature of the purging liquid in the soil column did not vary throughout the experiment. The purging liquid collected at the cathode end was removed in a timed interval and placed in a glass vial equipped with a Teflon lined cap for PCB analysis. Aqueous solutions from both electrode chambers were removed periodically for pH measurement.

Figure 13:
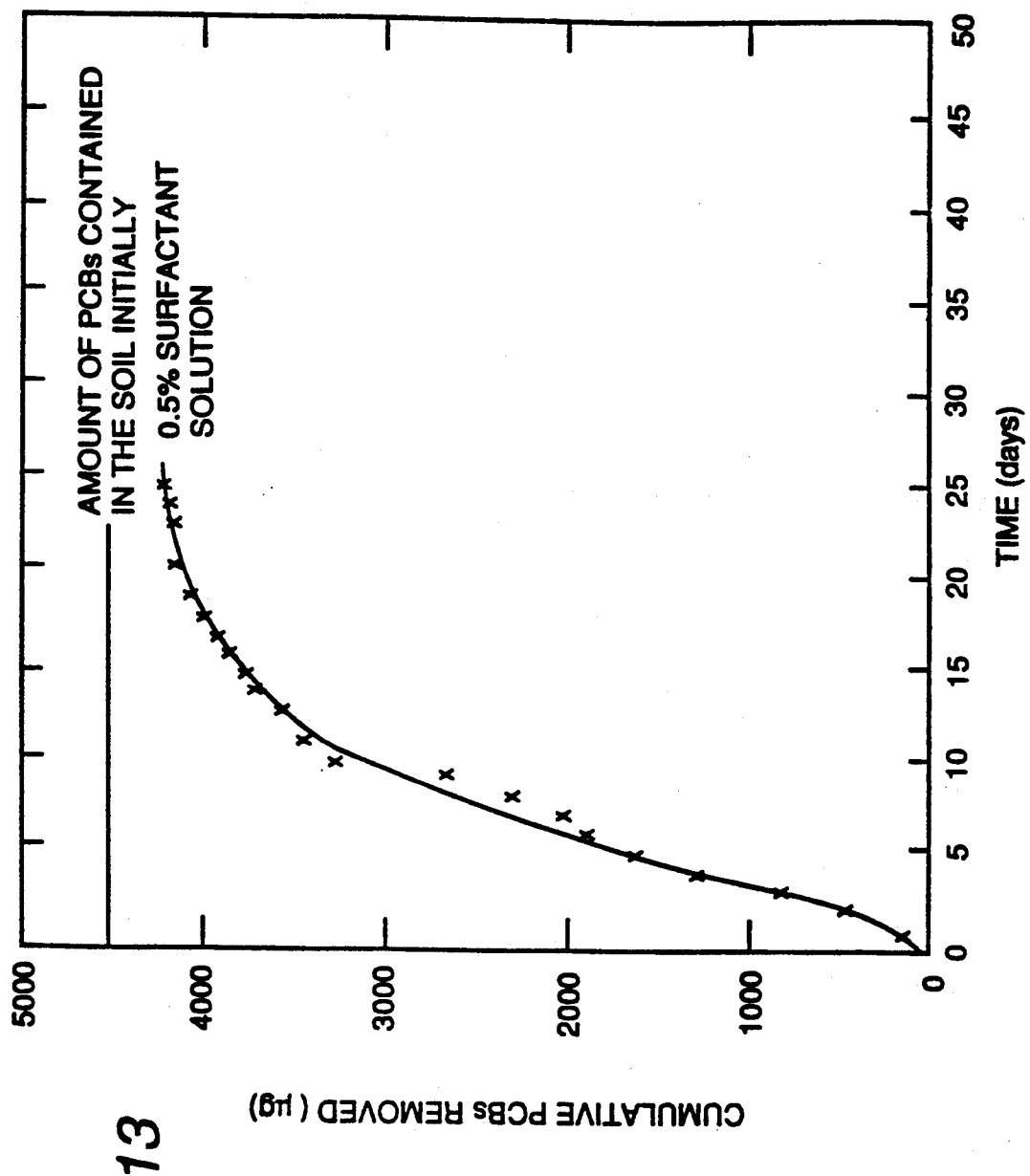
FIG. 13 is a graph of the cumulative amount of PCBs removed from a soil sample vs. time using 0.5% surfactant solutions as a purging liquid.

FIG. 13 shows the cumulative amount of PCBs removed from the soil during the course of the electroosmotic experiment using 0.5% Triton X-100 non-ionic solution as the purging liquid. Most of the PCBs (95%) in the soil were removed in 25 days.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of removing non-polar contaminants from a porous medium immersed in a polar liquid comprising the steps of:
   a) dispensing a chemical compound having both hydrophobic and hydrophilic segments capable of dissolving said non-polar contaminant in said polar liquid as a purging liquid through said porous medium and polar liquid so as to make contact with said non-polar contaminant and cause said non-polar contaminant to be at least partially dissolved in said polar liquid;
   b) applying a static electric field through said medium, said polar liquid, said non-polar contaminant and the purging liquid to cause the polar liquid and non-polar contaminant to move in a direction parallel to the electric field;
   c) collecting said polar liquid, said non-polar contaminant and the purging liquid; and
   d) removing the dissolved contaminant from said porous medium.

2. The method of removing non-polar contaminants of claim 1 wherein said polar liquid comprises a water solution and said non-polar contaminants comprise polychlorinated biphenyl (PCB) compounds.

3. The method of removing non-polar contaminants of claim 1 wherein the purging liquid comprises a surfactant solution capable of dissolving at least a portion of said contaminant in said polar liquid.

4. The method of removing non-polar contaminants of claim 1 wherein the surfactant comprises one of the group consisting of anionic surfactant, cationic surfactant, non-ionic surfactant and amphoteric surfactant.

5. The method of removing non-polar contaminants of claim 1 wherein the porous medium comprises soil.

6. A method of controlling the direction of seepage of non-polar contaminants embedded in a porous medium and immersed in a polar liquid comprising the steps of:
   a) dispensing a surfactant capable of dissolving said non-polar contaminant in said polar liquid as a purging liquid through said porous medium and polar liquid so as to make contact with said non-polar contaminant and cause said non-polar contaminant to be at least partially dissolved in said polar liquid;
   b) applying a static electric field in a predetermined direction through said medium, said polar liquid, said non-polar contaminant and the purging liquid to cause the polar liquid and non-polar contaminant to move in a direction parallel to the electric field; and
   c) adjusting the direction of the static electric field to correspond with a direction in which the non-polar contaminant is desired to seep.

* * * * *